(12) United States Patent
Komagamine et al.

(10) Patent No.: US 7,518,744 B2
(45) Date of Patent: Apr. 14, 2009

(54) PRINTING BASED ON USER SPECIFIED FORMATTED PRINT AND ACCORDING TO CAPABILITY OF THE PRINTER

(75) Inventors: Katsumi Komagamine, Nagano-ken (JP); Tatsuro Oshikawa, Nagano-ken (JP); Minoru Ichimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 590 days.

(21) Appl. No.: 10/525,855

(22) PCT Filed: Aug. 27, 2003

(86) PCT No.: PCT/JP03/10883

§ 371 (c)(1),
(2), (4) Date: Feb. 24, 2005

(87) PCT Pub. No.: WO2004/021164

PCT Pub. Date: Mar. 11, 2004

(65) Prior Publication Data

US 2006/0152540 A1    Jul. 13, 2006

(30) Foreign Application Priority Data

Aug. 30, 2002    (JP) .............................. 2002-252769

(51) Int. Cl.
  G06F 3/12    (2006.01)
  G06F 15/00    (2006.01)

(52) U.S. Cl. ..................................... 358/1.15; 358/1.13

(58) Field of Classification Search ................ 358/1.15, 358/1.14, 1.13, 1.18, 1.1, 1.16, 1.17, 1.9, 358/1.6, 407, 468, 400, 401, 1.2, 1.5, 1.11; 715/274; 399/1, 8; 347/2, 3, 5, 14, 23

See application file for complete search history.

(56) References Cited

U.S. PATENT DOCUMENTS 5,228,118 A * 7/1993 Sasaki ....................... 358/1.13
5,467,434 A * 11/1995 Hower et al. ................ 358/1.15
2001/0006423 A1    7/2001 Subramaniam
2002/0051166 A1    5/2002 Tomita
2002/0085225 A1    7/2002 Sada et al.

FOREIGN PATENT DOCUMENTS

| EP | 0 588 513 | 3/1994 |
| JP | 07-104949 | 4/1995 |
| JP | 2000-172469 | 6/2000 |
| JP | 2002-091747 | 3/2002 |

OTHER PUBLICATIONS

Abstract of Japanese Patent Publication No. 07-104949, Pub. Date: Apr. 21, 1995, Patent Abstracts of Japan.
Abstract of Japanese Patent Publication No. 2000-172469, Pub. Date: Jun. 23, 2000, Patent Abstracts of Japan.
Abstract of Japanese Patent Publication No. 2002-091747, Pub. Date: Mar. 29, 2002, Patent Abstracts of Japan.

* cited by examiner

*Primary Examiner*—Dov Popovici
(74) *Attorney, Agent, or Firm*—Martine Penilla & Gencarella, LLP

(57) ABSTRACT

Conventionally, it has been impossible to perform a formatted print precisely corresponding to functions of various printers. To solve this problem, formatted print data and printer capability data are stored. When a print instruction is issued, formatted print candidates are presented based on the formatted print data. When a formatted print is selected from these candidates, the printer capability data is referenced to set a combination of print conditions for performing the formatted print and actually perform printing. The printer capability data is stored for each printer model. Therefore, a proper print condition can be set for each printer model to perform a given formatted print. As a result, it becomes possible to perform a formatted print precisely corresponding to printer functions.

12 Claims, 8 Drawing Sheets

PRINTING BASED ON USER SPECIFIED FORMATTED PRINT AND ACCORDING TO CAPABILITY OF THE PRINTER

BACKGROUND OF THE INVENTION

The present invention relates to a print control apparatus, a print control method, a print control program, a medium for recording the print control program, an image processing apparatus, and an image processing computer.

In recent years, printers tend to have many functions to satisfy users' diverse needs. For example, there are developed printers capable of printing in various modes such as printing with no print margins and converting colors so as to more vividly develop colors than the original. However, providing a printer with many functions tends to increase the number of items for setting print conditions needed for printing. To free users from inconvenience of setting many print conditions, the printer may be configured to be capable of implementing the formatted print specified by a sensuous expression such as "beautiful mode" to broadly express the print condition.

The above-mentioned conventional print control apparatus has been subject to the following problems.

That is, printer functions have progressed remarkably. There have been developed many printers equipped with new functions. It has been impossible to provide formatted prints corresponding to various printers. It is very complicated to modify factory-default formatted print items in accordance with the printer function enhancement. When old and new models coexist and one printer is configured to a print condition according to the formatted print, the other printer is incapable of printing. The printer functions cannot be used fully.

SUMMARY OF THE INVENTION

The present invention has been made in consideration of the foregoing. It is therefore an object of the present invention to provide a print control apparatus, a print control method, a print control program, and a medium recording the print control program capable of formatted print exactly corresponding to printer functions.

To achieve the above-mentioned object, the present invention dynamically configures print conditions depending on printer capabilities in response to a specified formatted print. Therefore, the present invention can precisely comply with the printer function enhancement. Of course, the present invention can not only comply with the function enhancement for one model, but also set proper print conditions for a plurality of models according to function differences. It just needs to dynamically configure print conditions according to printer capabilities and acquire information about capabilities of a printer to perform printing. Further, it may be preferable to acquire information about capabilities of a connected printer. Alternatively, it may be preferable to acquire information about capabilities of a printer where a printer driver is installed to control printers.

The present invention can adopt various printer capabilities corresponding to print conditions. For example, each printer supports the following capabilities to be adopted such as ink types (color, monochrome, and the like), paper sizes, media (whether or not paper types or CD labels are printable), print margins, print qualities, color management types (whether or not automatic adjustment is available, colors exceeding the display's color gamut can be used, and the like), whether or not the automatic paper cut can be used, whether or not the bidirectional print is available, and whether or not the print direction can be changed (vertical or horizontal printing).

According to another mode of the present invention, printer capability data is stored for each model of a printer to indicate print conditions that can be set for the printer. Conditions for a formatted print are configured within a range of print conditions that can be set for a model of printers to perform printing. It is possible to perform the formatted print precisely corresponding to the printer model. Print conditions are configured within a range of print conditions specifiable for a model of printer to perform printing. Consequently, it is possible to dynamically configure print conditions according to the printer's capabilities.

Of course, the present invention can not only comply with the function enhancement for one model, but also set proper print conditions for a plurality of models according to function differences. It is possible to adopt various conditions such as the above-mentioned ink types, paper sizes, and the like as print conditions. To be capable of the formatted print, it just needs to determine conditions specifiable for printer models with respect to print condition items. Specifiable conditions may be stored. Flags may be used to identify specifiable and unspecifiable conditions. Various constructions can be adopted.

For example, paper sizes are available as print condition items. Let us assume that the print is possible for the A3 size but is possible for A4 and postcard sizes. In such case, information of "A4, postcard" may be stored as the specifiable print condition. Alternatively, it may be preferable to store information of flags "011" corresponding to A3, A4, and postcard sizes in order. Generally, specifiable print conditions vary with models. Print conditions are stored correspondingly to models to enable settings for the respective models. Of course, a user may need to only one model of printers. A printer driver for only one model may be installed on the computer. In these cases, it is sufficient to store the printer capability data for one model.

A formatted print data storage unit just needs to be able to store the formatted print data to provide formatted print candidates as formatted print options. A user just needs to be able to select formatted prints provided by a formatted print specification acceptance unit. Accordingly, there may be available various modes of candidates including specification of several print condition items such as paper sizes, inks, and sensuous expressions representing printout results. The sensuous expressions may include "highest image quality," "very beautiful," and the like. When printers are ready for printing, there are evident needs for obtaining results represented by sensuous expressions such as "beautiful" and "fast" as well as print paper types, sizes, and the like. The present invention is convenient enough to be able to perform printing precisely corresponding to models even though the formatted print is represented with sensuous expressions.

The formatted print specification acceptance unit just needs to extract and present formatted print candidates selectable for models of printers to perform printing. The formatted print specification acceptance unit just needs to accept the specification. Various constructions can be adopted to extract formatted print candidates. For example, one construction is to exclude and not to present formatted print candidates unselectable for models of printers to perform printing. Another construction is to provide but dim such formatted print candidates to make them unselectable. The above-mentioned printer capability data may be referenced to determine whether or not formatted prints can be selected for a printer to perform printing. When an unselectable formatted print is selected, an error indication may be generated to actually prevent the unselectable formatted print from being selected. A specified display apparatus such as a CRT may be used to display formatted print candidates. Input devices such as a keyboard and a mouse may be used to accept selection of formatted print candidates.

A print condition setup unit configures a combination of print conditions to perform a specified formatted print so as to be able to configure conditions within a range of print conditions specifiable for models of printers capable of printing. As a result, it is possible to configure print conditions precisely corresponding to functions of various models. The range of specifiable print conditions depends on each print item of each model. Whether or not the print condition is specifiable depends on whether or not the corresponding model can perform printing under that condition. For example, when a printer is capable of using paper sizes smaller than or equal to A4, the printer cannot use the A3 size.

Therefore, A3-size printing on this printer is outside the range of specifiable print conditions. When the formatted print is to be performed, the print condition may not be uniquely determined for a given associated item. The print condition can be determined for that item by choosing from any of specifiable print conditions. When a print condition item is outside the range of specifiable print conditions, all condition items need not be assumed to be incapable of printing for strictness. It may be preferable to approximate to a specified formatted print result by appropriately specifying the condition within the range of print conditions specifiable for each model.

Further, the formatted print data may include print conditions to implement printing of formatted print candidates. In this manner, some print conditions can be determined at a time point when each formatted print candidate is specified. Since the above-mentioned print condition setup unit configures print conditions, the formatted print data may include part of all print condition items. In addition, the formatted print data includes data indicating names for specifiably displaying formatted print candidates when provided as formatted print options.

That is, the formatted print specification acceptance unit can present the corresponding name and accept the formatted print specification. Since the formatted print data includes the print condition and data indicative of that name, it is possible to provide formatted print names comprising specific print conditions. The formatted print becomes available under the name of "reverse side of postcard for ink-jet printer," for example. When the formatted print name corresponds to the print condition itself for the formatted print, the print condition included in the name may be assumed to be mandatory. In such case, when there is no such printer as being able to satisfy the condition, it is possible to determine that the formatted print is infeasible before accepting the formatted print specification.

When a specific formatted print is to be performed, a specific print condition item may require a specific print condition. In consideration for this, a required print condition is stored correspondingly to each formatted print candidate. When the required cannot be specified for a printer to perform printing, it becomes possible to determine that the formatted print is infeasible before accepting the formatted print specification. The print condition setup unit may not need to configure conditions. Print conditions may be predetermined for specific items. When "no edge" is specified for the formatted print, for example, the print margin must be "0" or less. When "postcard address" is specified, for example, a specific value need not be required for the print margin.

Moreover, print conditions may be selected for respective setup items in the order of priorities to provide the print condition for the formatted print. This construction can configure more preferable conditions when a plurality of conditions can be specified for each print condition setup item. As a result, it is possible to obtain the most preferable result as a result of the formatted print itself implemented by a combination of a plurality of print conditions.

Furthermore, the printer driver is a module that is installed in the computer's OS and the like to control the printer. In many cases, an inquiry can be issued to the printer driver to acquire printer functions and selectable print conditions. The inquiry may be often implementable via a software interface.

Issuing an inquiry to the printer driver makes it possible to very easily acquire a print conditions selectable for the printer. Storing the print condition makes it possible to allow a computer functioning as the print control apparatus to reliably acquire the print condition specifiable for each model of printer. It is possible to configure the print condition to perform the formatted print that reliably makes the most of each printer's functions.

On the other hand, a condition specifiable for a given setup item depends on a condition for another setup condition. For example, the paper size "A4" disables the print condition of no white edges. The paper size "A5" enables the print condition of no white edges. The present invention is also applicable in such case. As a result, print conditions for the present invention can include not only conditions dependent only on printer models, but also conditions dependent on each other.

The above-mentioned technique dynamically configures print conditions for a specified formatted print but is not limited to a solid apparatus. The technique is also effective as the invention of the method. The above-mentioned print control apparatus may be available standalone or may be built in a given device. The concept of the invention includes various modes. The present invention can be variously embodied as software or hardware.

When the concept of the invention is embodied as the software for the print control apparatus, the present invention obviously exists and is used on a recording medium that records the software. For example, the present invention can be embodied as a print control program and as a medium that records the print control program. Of course, the recording medium may be a magnetic recording medium, a magnetic optical recording medium, on any medium to be developed in the future.

The same completely applies to duplication stages such as a primary duplicate copy, a secondary duplicate copy, and the like. Unlike the above-mentioned medium, a communication line may be used as a distribution method. In this case, the present invention is applied to the communication line as a transmission medium.

Other and further objects, features and advantages of the invention will appear more fully from the following description.

DETAILED DESCRIPTION OF THE PREFERRED EMBODIMENTS

The embodiment of the present invention will be described in the following order.

Figure 1:
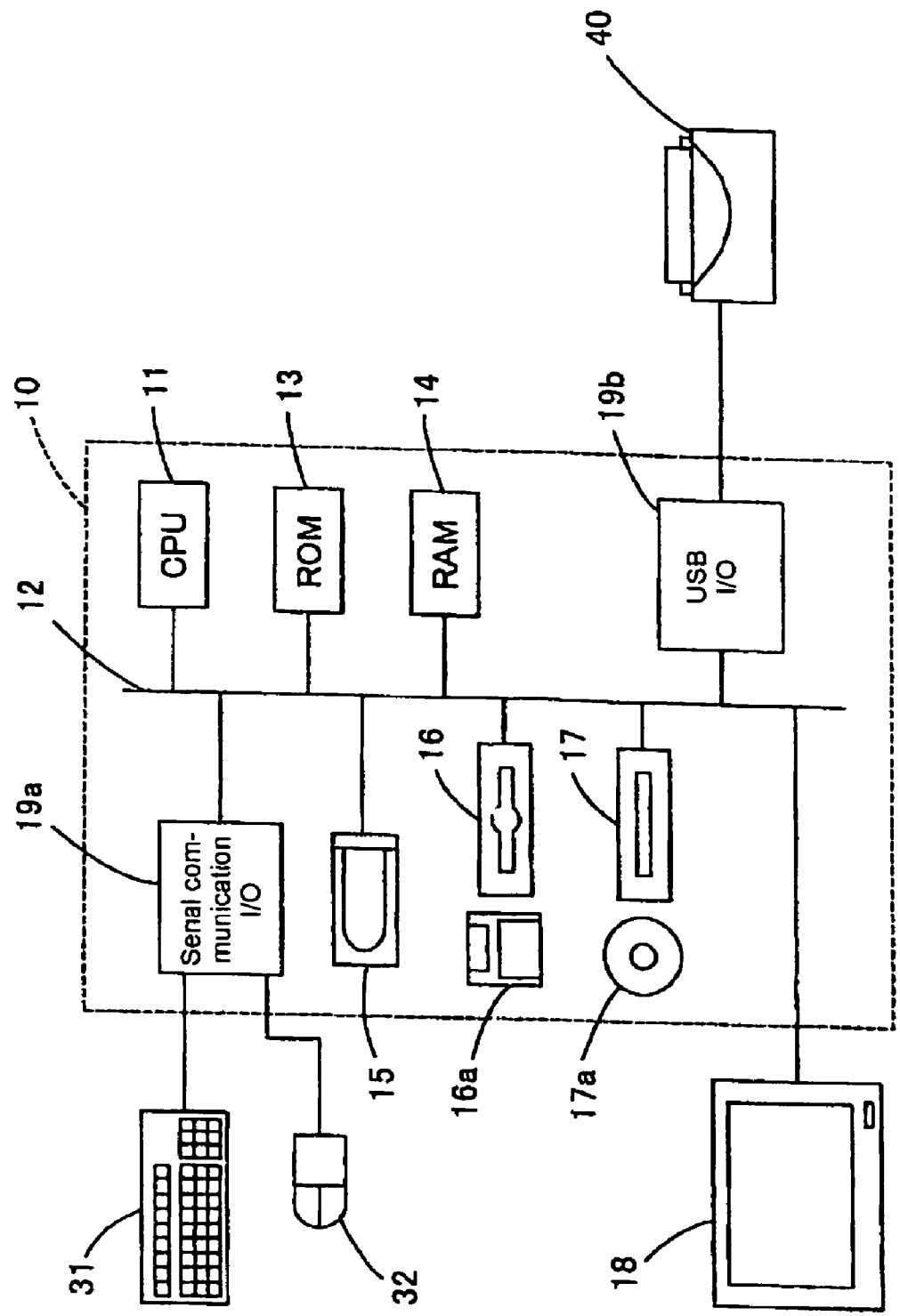
FIG. 1 schematically shows the hardware configuration of a system constructing a print control apparatus.
Figure 2:
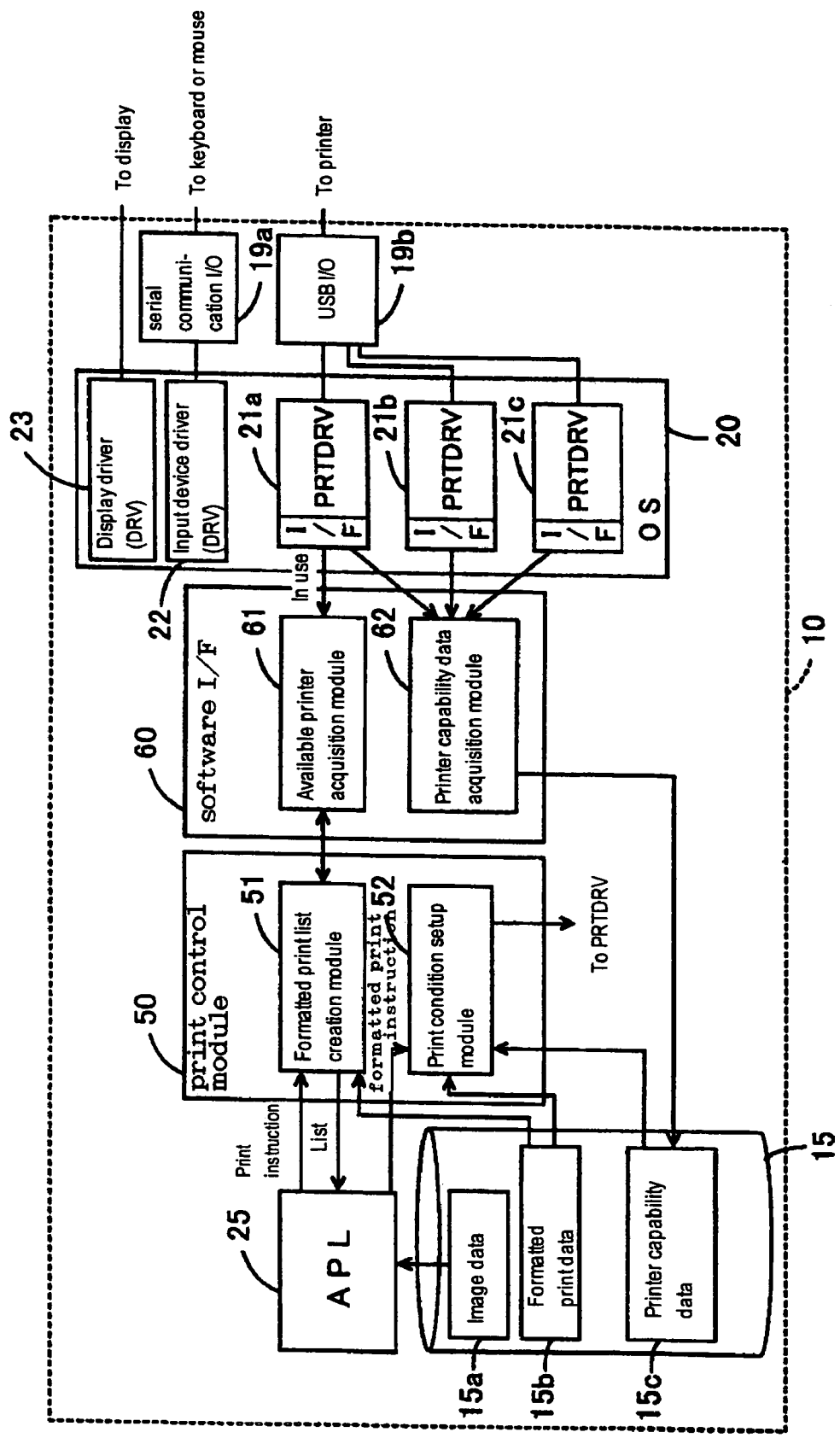
FIG. 2 schematically shows the configuration of a main control system implemented by a computer of the print control apparatus.

(1) Construction of the present invention (2) Structures of formatted print data and printer capability data (3) Print process and operations (1) Construction of the Present Invention FIG. 1 schematically shows the hardware configuration of a system constructing a print control apparatus according to the present invention. FIG. 2 schematically shows the configuration of a main control system implemented by a computer of the print control apparatus. According to the embodiment, the print control apparatus is constructed by the computer that controls a printer. When the printer is constructed to be capable of printing standalone, the print control apparatus is constructed by a section that is responsible for processing queries about the formatted print and print jobs inside the printer.

A computer 10 has a CPU 11 as a core of computation. The CPU 11 is capable of accessing ROM 13 storing BIOS and RAM 14 via a system bus 12. The system bus 12 is connected to external storages such as a hard disk drive (hereafter referred to as an HDD) 15, flexible disk drive 16, and a CD-ROM drive 17. The HDD 15 stores an OS, an application program (hereafter referred to as an APL), a print control module, and the like which are to be transferred to the RAM 14. The CPU 11 appropriately accesses the ROM 13 and the RAM 14 to execute the software. The CPU 11 uses the RAM 14 as a temporary work area to execute various programs.

The computer 10 connects with input operation devices such as a keyboard 31 and a mouse 32 via a serial communication I/O 19a. The computer 10 also connects with a display 18 for displaying data via a video board (not shown). The computer 10 is connectable to a printer 40 via a USB I/O 19b. The computer 10 is described with the simplified configuration and can use the general configuration as a personal computer. Of course, the present invention is not limited to personal computers. The embodiment is applied to a so-called desktop computer and may be also applied to notebook or mobile computers. The present invention is not limited to the connection interface between the computer 10 and the printer 40 and may use not only various connection modes such as SCSI and parallel interfaces, but also any connection mode that may be developed in the future.

In this example, the HDD 15 stores programs and the like. The recording medium is not limited to the HDD 15 and may be a flexible disk 16a or a CD-ROM 17a. The computer 10 reads a program recorded on the recording medium via the flexible disk 16a or the CD-ROM 17a and installs the program on the HDD 15. The program is read from the HDD 15 to the RAM 14 to control the computer. The present invention is not limited to the above-mentioned recording media and may use magnetic optical disks. Available semiconductor devices include nonvolatile memory such as flash cards. When the program is downloaded by accessing an external file server via a modem or a communication line, the present invention is applied by using the communication as a transmission medium.

The printer 40 performs printing under control of a printer driver installed in the computer 10. As shown in FIG. 2, the computer 10 according to the embodiment is installed with printer drivers (PRTDRV) 21a through 21c, an input device driver (DRV) 22, and a display driver (DRV) 23 in an OS 20. According to the embodiment, a plurality of PRTDRVs 21a through 21c are installed. The present invention is very effective when applied to a situation where one computer 10 can be connected to a plurality of printers. However, the plurality of PRTDRVs 21a through 21c need not necessarily be installed. The number of printer drivers to be installed is not limited to three. The display driver DRV 23 controls display of image data and the like on the display 18. The input device DRV 22 receives code signals from the keyboard 31 and the mouse 32 via the serial communication I/O 19a to accept specified input operations.

An APL 25 is an application program capable of retouching a color image and the like. Using the APL 25, a user can use the above-mentioned input operation devices to print the color image on the printer 40. According to a user's instruction, the APL 25 reads image data 15a recorded on the HDD 15 into the RAM 14. The APL 25 allows the display DRV 23 to display an image generated from the image data 15a on the display 18. When the user operates the input device, the APL 25 acquires operation contents via the input device DRV 22 to interpret the operation contents. According to the operation contents, the APL 25 performs various processes such as print instructions and retouching.

When the APL 25 issues a print instruction, a print control module 50 and a software I/F 60 are activated to accept the formatted instruction to print an image associated with the print instruction. To perform the formatted print as specified, the print control module 50 and the software I/F 60 set a print condition and pass this condition and the image data 15a to a proper PRTDRV. For this purpose, the print control module 50 has a formatted print list creation module 51 and a print condition setup module 52. The I/F 60 has an available printer acquisition module 61 and a printer capability data acquisition module 62. The HDD 15 stores formatted print data 15b and printer capability data 15c.

The formatted print list creation module 51 performs a process to provide formatted print candidates when the APL 25 issues a print instruction. That is, the formatted print list creation module 51 obtains a type of the printer 40 used for printing from the available printer acquisition module 61 for the software I/F 60 to be described. The formatted print list creation module 51 references the formatted print data 15b indicating formatted print candidates. The formatted print list creation module 51 also creates a list of formatted print candidates selectable for the type of the printer 40.

When creating the list, the embodiment excludes a formatted print unexecutable on the printer 40 being used. For this reason, the formatted print data 15b has a data structure to be described and comprises required data and optional data. The formatted print list creation module 51 references required data for each formatted print in the formatted print data 15b. The printer 40 being used may not have a function to perform printing according to the print condition specified by the required data. In such case, the associated formatted print is excluded from the candidates.

When issuing the print instruction, the APL 25 first provides a list of formatted print candidates. The user of the APL 25 can visually check the list on the display 18 and specify the formatted print using the mouse 32, for example. The specification of the formatted print is passed to the print condition setup module 52. The print condition setup module 52 configures a print condition for executing the specified formatted print. The print condition setup module 52 references formatted print data for the specified formatted print and configures the optional data.

When configuring the optional data, the print condition setup module 52 references the prestored printer capability data 15c. That is, the printer capability data 15c stores print conditions specifiable for printers according to each printer model. Reference to the printer capability data 15c can ensure conditions specifiable for the printer 40 with respect to each print condition setup item. Accordingly, any condition described in the printer capability data 15c enables printing on the printer 40.

The print condition setup module 52 adopts conditions of each item according to predetermined priorities to configure the print condition. According to the embodiment, the priority is assigned to each setup item. The print condition setup module 52 adopts conditions specifiable for the printer 40 in the descending order of priorities of course, the other techniques may be used to predetermine priorities. For example, priorities may be changed for each setup item according to printer models. Different priorities may be assigned to different formatted prints. Various modes can be adopted.

When the print condition is determined, its contents are passed to the PRTDRV that controls the printer to execute printing. When the APL 25 is used to print an image, its image data is passed to the PRTDRV at the same time. The PRTDRV configures the print conditions appropriate for printing. The PRTDRV applies color conversion or halftoning to the image data so as to satisfy the print condition and outputs print data to the printer 40. Consequently, the printer 40 produces a printout result exactly corresponding to the specified formatted print.

The software I/F 60 has a module that accesses PRTDRVs 21a through 21c to extract necessary information. The available printer acquisition module 61 obtains a printer that is connected to the computer 10 and is ready to perform printing in accordance with a print instruction from the APL 25. As shown in FIG. 2, a plurality of PRTDRVs 21a through 21c are installed. In such situation, the available printer acquisition module 61 determines which of the PRTDRVs 21a through 21c is used for printing on the printer 40. The available printer acquisition module 61 passes an available printer to the formatted print list creation module 51.

According to the embodiment, the available printer acquisition module 61 detects one of the PRTDRVs 21a through 21c to be assigned to a printer as a "default printer." The available printer acquisition module 61 assumes the printer under control of the PRTDRV to be an active printer. Of course, the other various modes can be adopted to determine available printers. For example, the APL 25 may inquire about a printer to be used together with issuance of the print instruction and accept a response.

The printer capability data acquisition module 62 generates printer capability data to be saved on the HDD 15. The printer capability data acquisition module 62 accesses the PRTDRVs 21a through 21c installed in the OS 20 to obtain specifiable print conditions, i.e., functions provided for printers under control of the PRTDRVs 21a through 21c. When obtaining specifiable print conditions, the printer capability data acquisition module 62 classifies the conditions into the PRTDRVs 21a through 21c and saves them as printer capability data in the HDD 15. The PRTDRVs 21a through 21c are programs to control specific printers. Since the print conditions are saved according to the classification into the PRTDRVs 21a through 21c, the print conditions can be stored correspondingly to printer models.

According to the embodiment, the PRTDRVs 21a through 21c have the software I/F as shown in FIG. 2. The available printer acquisition module 61 and the printer capability data acquisition module 62 provided for the software I/F 60 interchange data with each other via the software I/F. There is a scheme of using function calls so that the software I/F for the PRTDRVs 21a through 21c can return data such as IDs. The scheme facilitates interchange of data and generation of printer capability data, and the like.

(2) Structures of Formatted Print Data and Printer Capability Data

Figure 3:
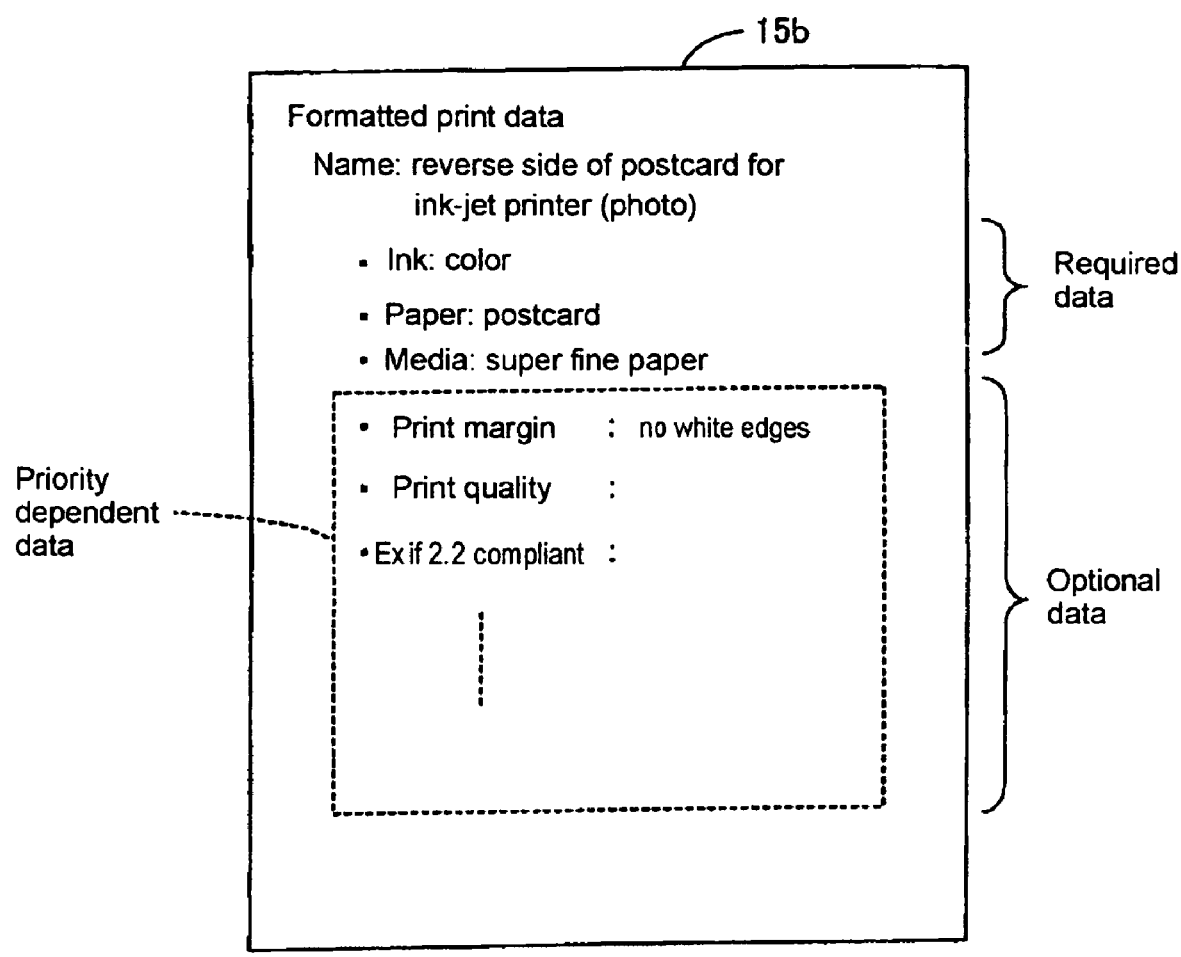
FIG. 3 shows an example of formatted print data.

Using a specific example, the following details structures of the formatted print data and the printer capability data used in the above-mentioned construction. FIG. 3 shows an example of formatted print data. FIG. 3 schematically shows the formatted print data structure. In this example, required data is shown in an upper part of FIG. 3 and comprises three pieces of data (ink, paper (size), and media (type)). Optional data is enclosed in a broken line below. The optional data depends on priorities as mentioned above. The formatted print data has a specified name. The name is displayed when the formatted print list creation module 51 provides a list of formatted print candidates.

According to the embodiment, the required data closely corresponds to the name. The required data items correspond to those needed to perform the formatted print indicated by the name. Print conditions are predetermined as default values so as to perform the formatted print. The example of FIG. 3 is used to print a photo on the reverse side of a postcard for ink-jet printers. For this purpose, the conditions include color ink for the ink, a postcard for the paper, and super-fine paper, i.e., a specific type of paper for the media. Accordingly, these settings enable printing based on the formatted print configured as "reverse side of postcard for ink-jet printer (photo)."

Of course, the name and the required data are provided as an example. The other various modes may be adopted. For example, it is possible to define formatted prints with various names such as "postcard address", "A4 super image quality", and "A4 glossy paper with no white edges." According to the present invention, the formatted print name may not be strictly associated with the required data. For example, formatted print names may include somewhat ambiguous and sensuous expression such as "A4 super image quality." In this case, the expression "super image quality" does not uniquely define the print condition. However, the formatted print named "A4 super image quality" becomes implementable by setting conditions to improve the image quality according to the above-mentioned priorities.

Figure 4:
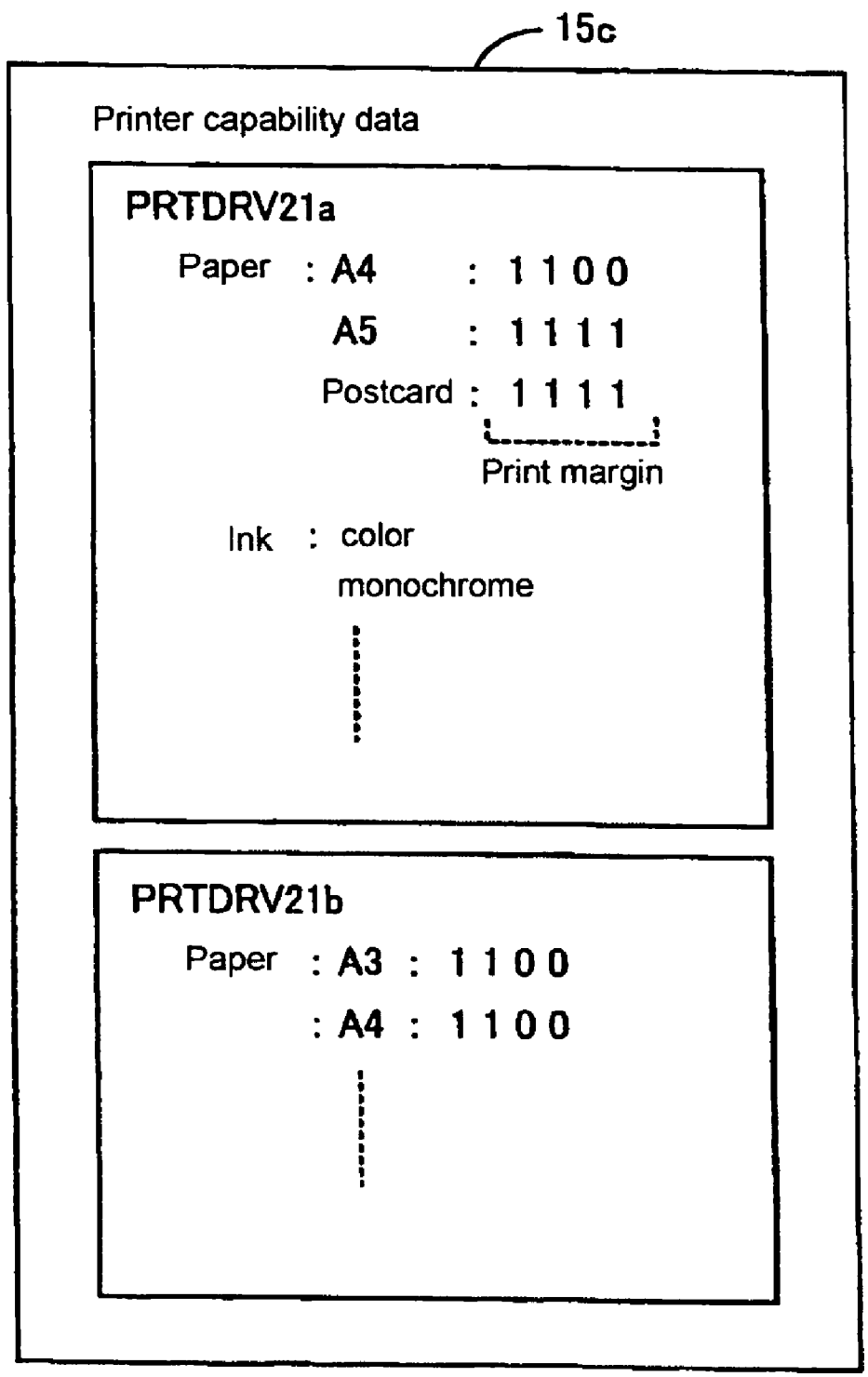
FIG. 4 shows an example of printer capability data.

For the PRTDRV to actually perform printing, it is necessary to configure print condition items other than the required data. The printer capability data 15c is referenced to configure each item in the optional data. FIG. 4 shows an example of printer capability data. FIG. 4 schematically shows the printer capability data structure. As shown in FIG. 4, specifiable print conditions are registered for each PRTDRV installed in the OS 20. When the APL 24 issues print instruction according to the embodiment, the HDD 15 may not store the printer capability data for the PRTDRV to be used for print execution. In such case, the printer capability data acquisition module 62 becomes active to obtain the printer capability data.

The example in FIG. 4 shows registration of the printer capability data including "A4, A5, postcard" as the paper types for the PRTDRV 21a. That is, the printer under control of the PRTDRV 21a can print on any of paper types such as "A4, A5, and postcard." According to the present invention, the print condition items can depend on each other. FIG. 4 exemplifies this. That is, as print condition items, the paper and the print margin depend on each other. The print margin is specified with a flag and is defined for each of "A4, A5, and postcard."

In this example, available print margins are "standard, bottom enlargement, no white edges sideways, and no white edges." The print margins in FIG. 4 are indicated by flags. The flag set to "1" enables the setting. The flag set to "0" disables the setting. As shown in FIG. 4, the paper size "A4" permits the settings of "standard and bottom enlargement." The paper sizes "A5 and postcard" permit all settings of "standard, bottom enlargement, no white edges sideways, and no white edges." The same model of printers under control of the PRTDRV 21a can set different print margins depending on paper sizes. In thin meaning, the print condition items depend on each other. The bottom enlargement setting decreases the margin at the bottom of the paper to enlarge a print area toward the bottom of the paper.

As mentioned above, the printer capability data describes print conditions specifiable for each PRTDRV. The print condition setup module 52 determines the formatted print data based on information of the printer capability data and the priority. The optional data shown at the bottom of FIG. 3 is not limited to a specific setting during execution of the formatted print named "reverse side of postcard for ink-jet printer (photo)." Accordingly, the optional data is determined by the priority.

According to the embodiment, for example, let us assume that the print margins are defined as "no white edges, no white edges sideways, bottom enlargement, and standard" in the ascending order of priorities. The printer capability data permits all the settings of "standard, bottom enlargement, no white edges sideways, and no white edges" for the postcard paper. Accordingly, "no white edges" is selected as the highest priority and is used for the print margin. The A4 paper is permitted to use only the settings "standard and bottom enlargement." In this case, the more highly prioritized "bottom enlargement" is assumed.

The print condition setup module 52 can determine the optional data by referencing the printer capability data 15c as mentioned above. In addition, the other various items can be defined as conditions for the printer capability data. For example, a print quality item can be assigned a plurality of different conditions such as the resolution and the print speed. In an item of color management type, it is possible to determine whether or not to automatically adjust colors by means of image processing, whether or not to use colors exceeding the display's color gamut, and the like. It is possible to determine whether or not to use the automatic paper cut, enable the bidirectional printing, and change the print direction (vertical or horizontal printing). Another condition can be the number of colors (six, seven, and the like) to be used for the printer. Still another condition can be provided to determine whether or not to perform image processing for reproducing the object's color tone according to situations of photographing based on header information compliant with the Exif 2.2 standard (Exif is a registered trademark of The Japan Electronics and Information Technology Industries Association).

(3) Print Process and Operations

Figure 5:
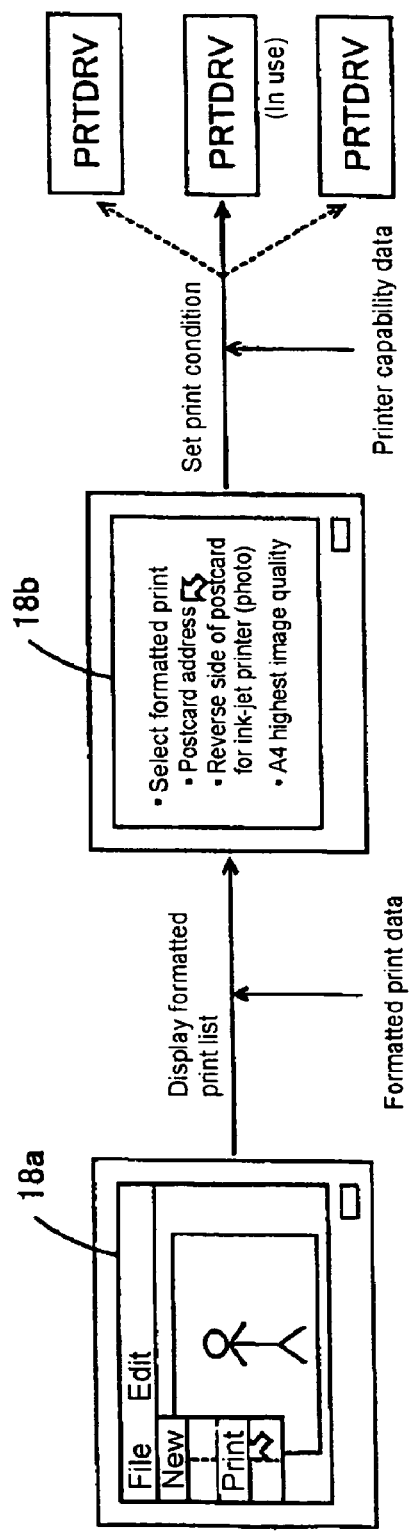
FIG. 5 diagrams print operations to be performed.
Figure 6:
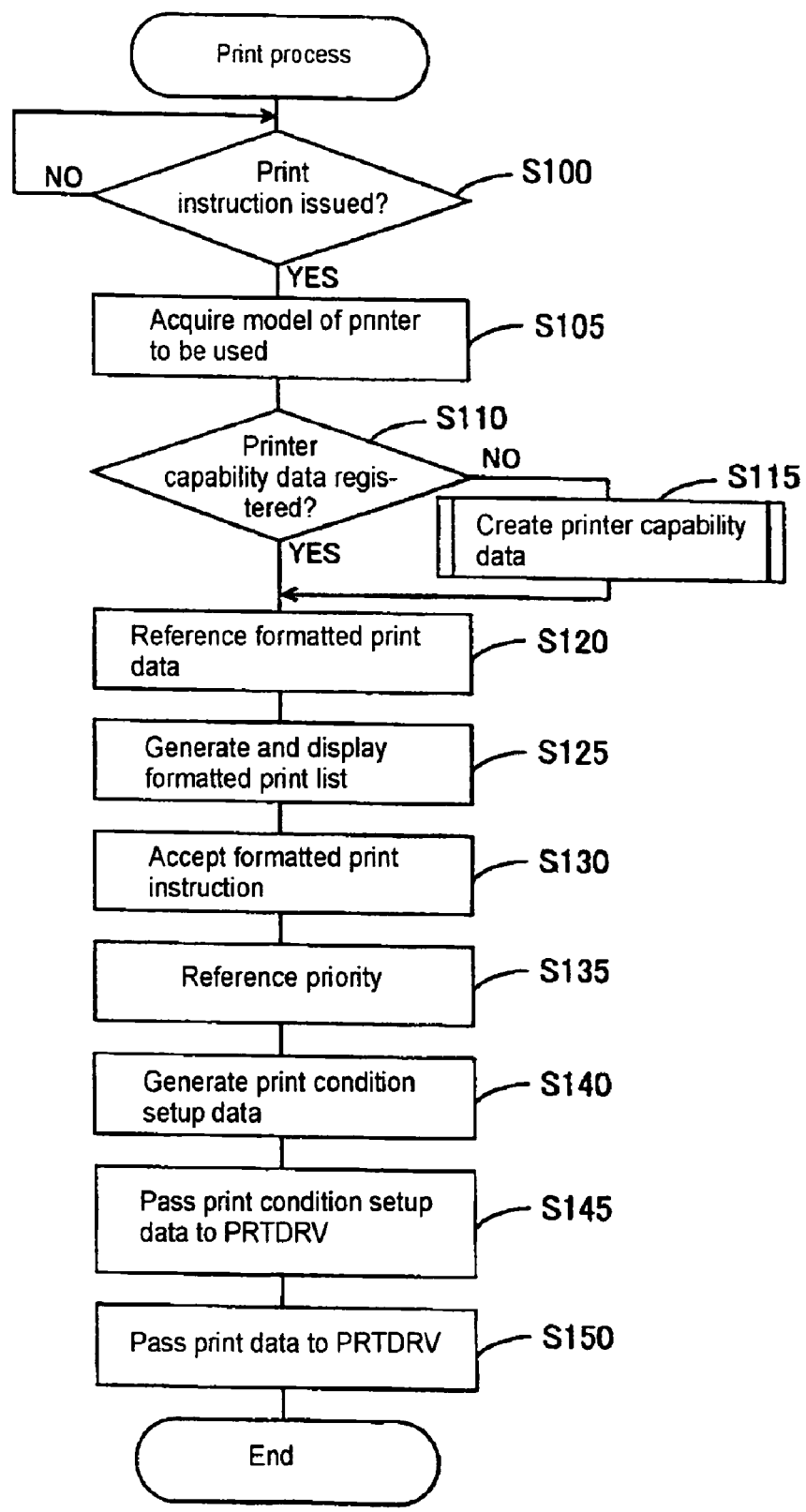
FIG. 6 is a flowchart showing a print process.

The following describes the process and operations of the embodiment according to the above-mentioned construction. FIG. 5 diagrams actual print operations to be performed according to the present invention. FIG. 6 is a flowchart showing a print process. FIG. 5 shows screens displayed on the display 18 during execution of the APL 25. A screen 18a shows a screen example during execution of the APL 25. As mentioned above, the APL 25 can retouch an image and the like and issue an instruction to print the image. A user can instruct printing by selecting a print menu on the screen 18a.

In response to the print instruction, the embodiment does not display a property screen for the PRTDRV associated with the default printer. Instead, the print control module 50 and the software I/F 60 are activated in accordance with the process in FIG. 6. When the print instruction is issued at Step S100, the print control module 50 and the software I/F 60 are activated. At Step S105, the available printer acquisition module 61 detects the PRTDRV for the default printer out of the PRTDRVs 21a through 21c via the PRTDRV I/F to acquire the model of the active printer 40. The acquired model of the printer 40 is notified to the formatted print list creation module 51.

At Step S110, the available printer acquisition module 61 determines whether or not the HDD 15 already stores the printer capability data 15c for the model of the printer 40. When that data is not stored, a printer capability data creation process is performed at Step S115. At Step S120, the formatted print list creation module 51 references the formatted print data 15b on the HDD 15 and excludes formatted prints unavailable to the acquired printer 40 from the list. At Step S125, the formatted print list creation module 51 notifies the APL 25 of formatted print candidates. As a result, the process activates a GUI to display the formatted print candidates. The screen of the display 18 changes to a screen 18b as shown in FIG. 5.

That is, the screen lists names stored in the formatted print data 15b. Visually checking the screen 18b, the user can operate the mouse 32 and the like, select any of the formatted print names using the pointer, and click the mouse button to specify the formatted print. At Step S130, the print condition setup module 52 accepts the specified formatted print. Conditions other than the required data are not settled in the formatted print data for the accepted formatted print. At Step S135, the process references predetermined priorities. At Step S140, the process assigns highly prioritized conditions to the print condition items in the optional data to generate print condition setup data comprising a combination of print condition settings.

At Step S145, the generated print condition setup data is passed to the PRTDRV that controls the above-mentioned active printer 40. At Step S150, the APL 25 passes image data corresponding to the print instruction to the PRTDRV. The PRTDRV generates print data to perform printing according to the print condition and outputs the print data to the printer 40. As a result, the formatted print precisely corresponds to the function of the active printer 40. The printer 40 generates a printout result in accordance with the formatted print as specified by the user.

Figure 7:
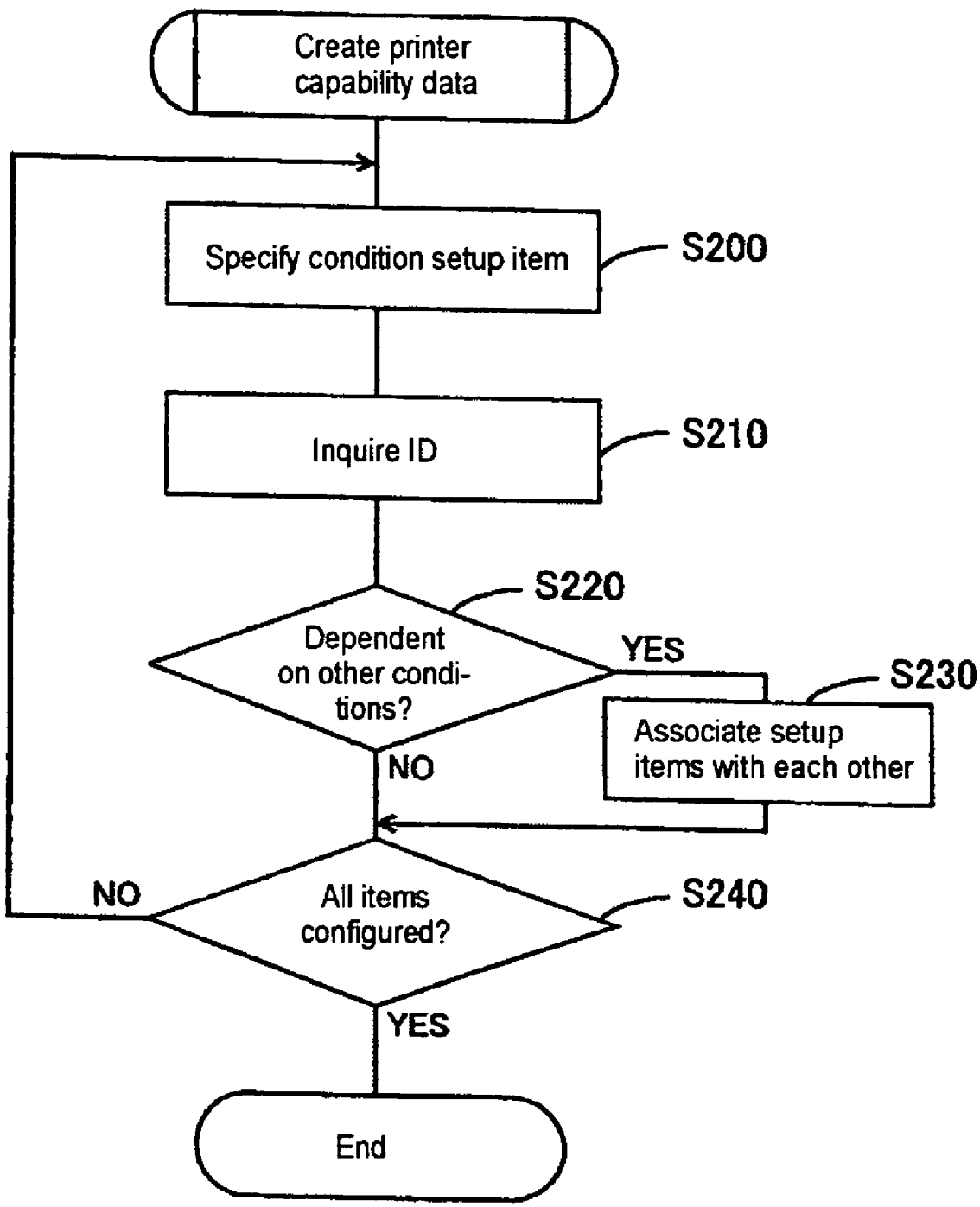
FIG. 7 is a flowchart showing a process to create printer capability data.

FIG. 7 is a flowchart of the printer capability data creation process performed by the printer capability data acquisition module 62 at Step S115 as mentioned above. According to the embodiment, the available printer acquisition module 61 performs the printer capability data creation process when the HDD 15 does not store the printer capability data 15c about types of the printer 40 to perform printing of course, the printer capability data creation process may be performed when the PRTDRV is installed, for example.

At Step S200, the process sets a print condition item to be acquired from the PRTDRV. At Step S210, the process calls a function to acquire a condition for the corresponding item. As a result, the function returns an ID indicating specifiable print conditions via the PRTDRV's software I/F. This makes it possible to identify the specifiable print conditions. At Step S220, the process determines whether or not items of the print condition depend on those of the other print conditions. When it is determined that items of the print condition depend on those of the other print conditions, the process associates the setup items with each other based on the dependence at Step S230 to store the setup items as printer capability data. That is, the process associates a plurality of print condition items with each other as shown in FIG. 4.

At Step S240, the process determines whether or not print conditions are configured for all print condition items that can be acquired from the PRTDRV. The process is repeated from Step S200 and later until print conditions are determined to be configured for all the print condition items at Step S240. In this manner, the process sequentially records the printer capability data 15c about types of the printer 40 to perform printing. As a result, the database as shown in FIG. 4 is created with respect to the printer capability data about the PRTDRVs.

The present invention can be interpreted as an image processing apparatus according to the following process. That is, at Step S100, the process can display the print menu and accept a print instruction in response to the selection operation. At Steps S105 through S125, the process displays candidates for available formatted prints on a specified printer based on the accepted print instruction. At Step S130, the process accepts the specification of any formatted print corresponding to a selection operation associated with the display. At Steps S135 and S140, the process generates a print condition for the printer corresponding to the specified formatted print. At Steps S145 and S150, the process generates print data to perform printing based on the print condition.

Figure 8:
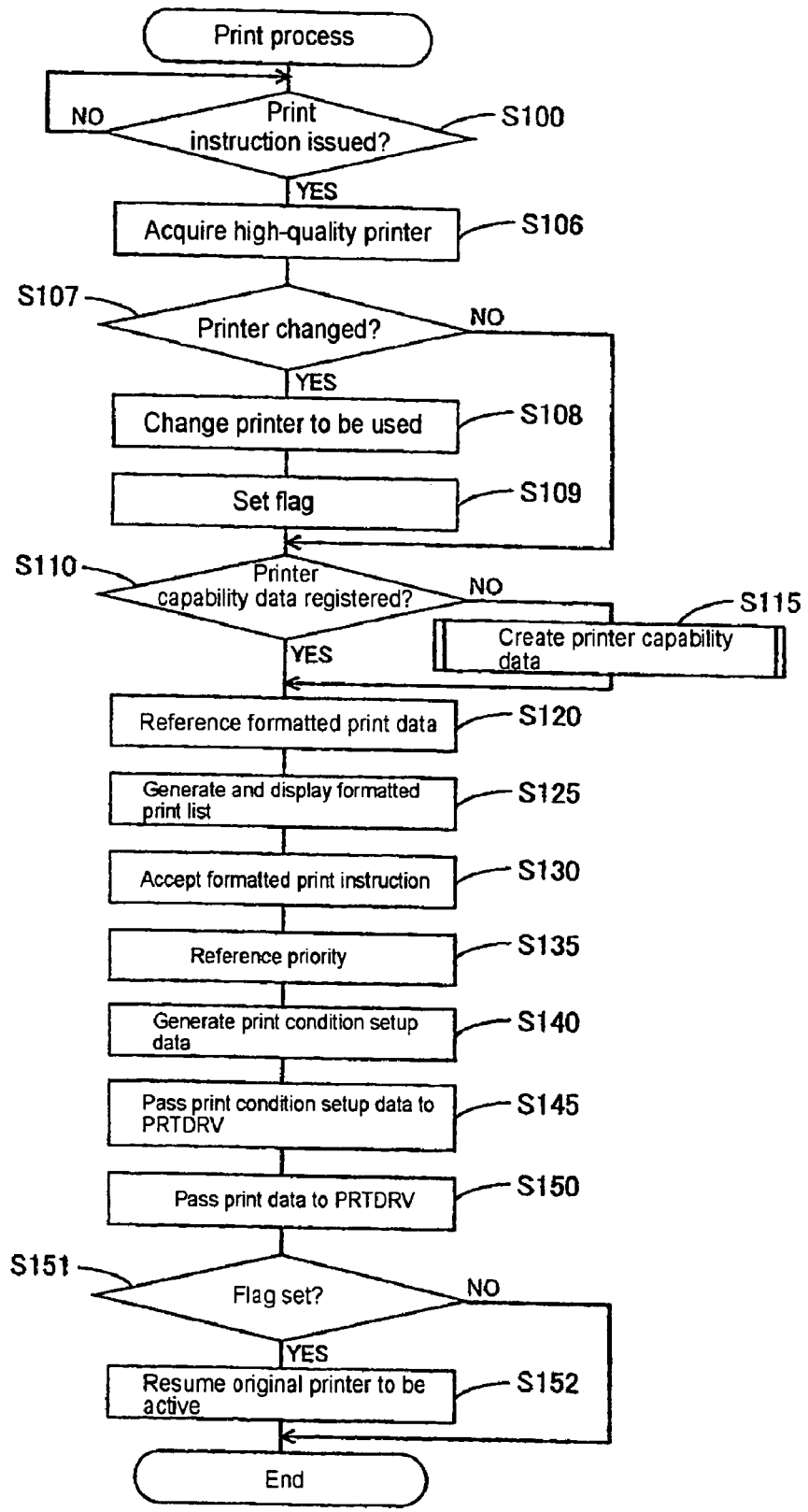
FIG. 8 is a flowchart showing a modification of the print process.

At Step S105, the available printer acquisition module 61 acquires default printer models and creates a list of formatted prints and the like on the assumption that the acquired printer 40 is used for printing. As shown in a flowchart of FIG. 8, the available printer acquisition module 61 at Step S106 may detect any one of the registered PRTDRVs 21a through 21c so that the detected PRTDRV can correspond to a printer capable of printing with the highest quality. Various viewpoints are available concerning criteria about the print quality. As an example, the print density is most highly prioritized and then the number of ink colors is taken into consideration. This technique can be used to determine the order of qualities. The available printer acquisition module 61 can acquire these pieces of information by issuing an inquiry to the PRTDRVs 21a through 21c.

When detecting the PRTDRV, the process proceeds at Step S110 and later sequentially such as displaying the list of formatted prints based on the printer 40 corresponding to the detected PRTDRV.

Further, at Step S107, the process may determine whether or not the currently active printer 40 differs form the printer capable of printing with the best quality. When they differ from each other, the process may temporarily assume the printer capable of printing with the best quality to be the currently active printer. At Step S109, the process may set a flag. After printing, the process may reference the flag at Step S151. When the flag is set, at Step S152, the process may reconfigure the printer 40 to be the active printer.

As mentioned above, the present invention stores the formatted print data and the printer capability data. When a print instruction is issued, the present invention provides formatted print candidates based on the formatted print data. When a formatted print is selected from these candidates, the present invention references the printer capability data. The present invention configures a combination of print conditions for performing the formatted print and performs the print. The printer capability data is stored for each printer model. Therefore, it is possible to specify a proper print condition for each printer model to perform a given formatted print. As a result, it becomes possible to perform the formatted print precisely corresponding to the printer function.

As mentioned above, the present invention dynamically configures print conditions depending on printer capabilities in response to a specified formatted print. The present invention can precisely comply with the printer function enhancement.

The foregoing invention has been described in terms of preferred embodiments. However, those skilled, in the art will recognize that many variations of such embodiments exist. Such variations are intended to be within the scope of the present invention and the appended claims.

What is claimed is:

1. A print control apparatus which allows a printer to perform printing in accordance with a print instruction issued from an application program, the print control apparatus comprising:
    a printer capability data storage unit that acquires printer capability data by issuing an inquiry to a printer driver to control the printer and stores the printer capability data of each model of printer, wherein the printer capability data indicates capability of the printer;
    a printer acquiring unit that acquires a model of the printer used for printing when the application program issues the print instruction;
    a formatted print list creation unit that extracts only formatted prints containing required printing conditions executable by the printer used for printing out of a plurality of formatted prints that is respectively composed of required printing conditions and optional printing conditions, and displays a list of the extracted formatted prints on a display;
    a formatted print specification acceptance unit that accepts a selection of a formatted print in the list displayed on the display;
    a print condition setup unit that sets the optional printing conditions of the formatted print selected from the list within a range of capability of the printer used for printing by referring to the printer capability data of the model that is acquired by the printer acquiring unit; and
    a printer driver that allows the printer used for printing to perform printing under the required printing conditions of the formatted print selected from the list and the optional printing conditions set by the print condition setup unit.

2. The print control apparatus according to claim 1, wherein said formatted print list creation unit displays a name for specifying each of the extracted formatted prints in the list.

3. The print control apparatus according to claim 1, wherein said printer capability data describes print conditions configurable on the printer and contains a priority for each of the print conditions; and wherein said print condition setup unit sets a print condition with higher priority among print conditions described in the printer capability data as the optional printing conditions.

4. The print control apparatus according to claim 1, wherein said printer capability data defines a print condition so that a condition for a given setup item depends on a condition for another setup item.

5. A print control method of allowing a printer to perform printing in accordance with a print instruction issued from an application program, said method comprising:
    acquiring a model of the printer used for the printing when the application program issues the print instruction;
    extracting only formatted prints containing required printing conditions executable by the printer used for the printing out of a plurality of formatted prints that is respectively composed of required printing conditions and optional printing conditions;

displaying a list of the extracted formatted prints on a display;

accepting a selection of a formatted print in the list displayed on the display;

setting the optional printing conditions of the formatted print selected from the list within a range of capability of the printer used for the printing by referring to printer capability data of the model that is acquired, wherein the printer capability data is stored in a specified storage for each model of printer by issuing an inquiry to a printer driver to control the printer and indicates capability of the printer; and allowing the printer used for printing to perform printing under the required printing conditions of the formatted print selected from the list and the optional printing conditions that are set.

6. The print control method according to claim 5, further comprising:

displaying a name for specifying each of the extracted formatted prints in the list.

7. The print control method according to claim 5, wherein said printer capability data describes print conditions configurable on the printer and contains a priority for each of the print conditions; and wherein the setting of the optional printing conditions includes setting a print condition with higher priority among print conditions described in the printer capability data as the optional printing conditions.

8. The print control method according to claim 5, wherein said printer capability data defines a print condition so that a condition for a given setup item depends on a condition for another setup item.

9. A computer-readable storage medium having a print control program stored thereon, the print control program allowing a printer to perform printing in accordance with a print instruction issued from an application program, and the print control program enabling a computer to implement:

a function of acquiring a model of the printer used for the printing when the application program issues the print instruction;

a function of extracting only formatted prints containing required printing conditions executable by the printer used for the printing out of a plurality of formatted prints that is respectively composed of required printing conditions and optional printing conditions;

a function of displaying a list of the extracted formatted prints on a display;

a function of accepting a selection of a formatted print in the list displayed on the display;

a function of setting the optional printing conditions of the formatted print selected from the list within a range of capability of the printer used for the printing by referring to printer capability data of the model that is acquired, wherein the printer capability data is stored in a specified storage for each model of printer by issuing an inquiry to a printer driver to control the printer and indicates capability of the printer; and a function of allowing the printer used for printing to perform printing under the required printing conditions of the formatted print selected from the list and the optional printing conditions that are set.

10. An image processing apparatus which generates print data for printing by a printer in accordance with a print instruction issued from an application program, the image processing apparatus comprising:

a printer capability data storage unit that acquires printer capability data by issuing an inquiry to a printer driver to control the printer and stores the printer capability data of each model of printer, wherein the printer capability data indicates capability of the printer;

a printer acquiring unit that acquires a model of the printer used for the printing when the application program issues the print instruction;

a formatted print list creation unit that extracts only formatted prints containing required printing conditions executable by the printer used for printing out of a plurality of formatted prints that is respectively composed of required printing conditions and optional printing conditions, and displays a list of the extracted formatted prints on a display;

a formatted print specification acceptance unit that accepts a selection of a formatted print in the list displayed on the display;

a print condition setup unit that sets the optional printing conditions of the formatted print selected from the list within a range of capability of the printer used for printing by referring to the printer capability data of the model that is acquired by the printer acquiring unit; and a printer driver that generates print data for allowing the printer used for printing to perform printing under the required printing conditions of the formatted print selected from the list and the optional printing conditions set by the print condition setup unit.

11. An image processing apparatus which generates a print data for printing by a printer in accordance with a print instruction issued from an application program, the image processing apparatus comprising:

a printer capability data storage unit that acquires printer capability data by issuing an inquiry to a printer driver to control the printer and stores the printer capability data of each model of printer, wherein the printer capability data indicates capability of the printer;

a printer determining unit that, when the application program issues the print instruction, determines whether or not there are available a plurality of printers capable of printing and, when they are available, determines a printer to be used for printing based on print quality;

a formatted print list creation unit that extracts only formatted prints containing required printing conditions executable by the printer used for printing out of a plurality of formatted prints that is respectively composed of required printing conditions and optional printing conditions, and displays a list of the extracted formatted prints on a display;

a formatted print specification acceptance unit that accepts a selection of a formatted print in the list displayed on the display;

a print condition setup unit that sets the optional printing conditions of the formatted print selected from the list within a range of capability of the printer used for printing by referring to the printer capability data of a model of the printer used for printing; and a printer driver that generates the print data for allowing the printer used for printing to perform printing under the required printing conditions of the formatted print selected from the list and the optional printing conditions set by the print condition setup unit.

12. An image processing computer which allows a printer to perform printing in accordance with a printer instruction issued from an application program, said computer comprising:

a printer capability data storage module that acquires printer capability data by issuing an inquiry to a printer driver to control the printer and stores the printer capability data of each model of printer, wherein the printer capability data indicates capability of the printer;

a printer acquiring module that acquires a model of the printer used for printing when the application program issues the print instruction;

a formatted print list creation module that extracts only formatted prints containing required printing conditions executable by the printer used for printing out of a plurality of formatted prints that is respectively composed of required printing conditions and optional printing conditions, and displays a list of the extracted formatted prints on a display;

a formatted print specification acceptance module that accepts a selection of a formatted print in the list displayed on the display;

a print condition setup module that sets the optional printing conditions of the formatted print selected from the list within a range of capability of the printer used for printing by referring to the printer capability data of the model that is acquired by the printer acquiring module; and a printer driver that generates print data for allowing the printer used for printing to perform printing under the required printing conditions of the formatted print selected from the list and the optional printing conditions set by the print condition setup module.

* * * * *